United States Patent [19]
Kemper

[11] 3,800,495
[45] Apr. 2, 1974

[54] DOUGH TREATING AND TRAY LOADING MACHINES

[76] Inventor: Kate Kemper, Lange Strasse 8-10, 4833 Neuenkirchen near Gutersloh, Germany

[22] Filed: July 2, 1971

[21] Appl. No.: 159,282

[30] Foreign Application Priority Data
July 4, 1970 Germany............................ 2033315
Sept. 24, 1970 Germany............................ 2047017
Nov. 30, 1970 Germany............................ 2058913

[52] U.S. Cl.......................... 53/52, 53/123, 53/160, 53/246, 53/250, 198/21
[51] Int. Cl..... B65b 5/10, B65b 57/00, B65b 63/00
[58] Field of Search.............. 53/160, 246, 249–251, 53/52, 123; 198/21, 23, 27; 425/238–241

[56] References Cited
UNITED STATES PATENTS
2,704,177  3/1955  Neaves................................. 53/160
2,744,372  5/1956  Cleaveland et al. .................. 53/246
2,750,899  6/1956  Marasso............................ 53/160 X
3,034,455  5/1962  Roth et al. ........................ 198/21 X
3,108,677  10/1963  Temple................................. 198/21
3,171,365  3/1965  Dunnam ........................... 53/246 X
3,519,119  7/1970  Hershey.............................. 198/21

FOREIGN PATENTS OR APPLICATIONS
1,142,619  9/1957  France................................ 198/27

Primary Examiner—Robert L. Spruill
Attorney, Agent, or Firm—Spencer & Kaye

[57] ABSTRACT

The present invention has reference to improvements in dough treating machines and deals especially with the formation of dough and like bakery products and their transfer after being loaded on pivotable or tiltable supports which are swingably connected to one or more carriers. These carriers are discharged from one magazine and move along a predetermined course and are then displaced relative to said course to arrive at another magazine whence said carriers are dispatched and deliver their dough products for final treatment to a plant, such as an oven plate.

6 Claims, 22 Drawing Figures

DOUGH TREATING AND TRAY LOADING MACHINES

SUMMARY OF THE INVENTION

The invention concerns improvements in dough treating and handling machines and more specifically deals with a combination dough dividing and rounding machine with a feed device and forming station for dough products to continuously prepare and transport the same on carriers in timed relation in order to obtain small breads, rolls and like bakery products of substantially even form and appearance.

The invention also concerns operable means for handling a carrier of the aforesaid type which includes supports mounted thereon and constructed for tilting the latter through a mechanism which forms part of each carrier and of said operable means to bring about discharge of dough pieces for oven treatment.

A known machine set-up of this type consists of a dough dividing and rounding device to which a dough mass is fed and which delivers then round-shaped dough pieces to a conveyor structure to which are joined a rolling and folding station. Such combination dough dividing and rounding machinery produces especially small breads, twisted rolls, French rolls, etc.

After the dough pieces have passed through the rolling station and the folding device, they arrive with their rolling face down on tiltable supports of frame-shaped carriers. Each carrier is then fed through a fermentation room and then to an oven where the small dough products, such as rolls or small breads are placed with their rolling face up on an oven plate surface while a mechanism becomes actuated for tilting or imparting rotative displacement to the shallow supports extending crosswise to the carrier or frame.

In general it can be said that the invention contemplates a construction and design of machines of the aforesaid type permitting a single person to fully operate and survey such machines. It must be kept in mind that the tiltable supports of the successive carriers correspond generally and approximately to the length of the plate of the baking oven or like plant, which is given and measures, as a rule, about 160 cm, whereas the width amounts to 60 cm. A carrier with tiltable support elements of this size, which are to be loaded with dough pieces in fermentation stage can no longer be handled by a single person if no other measures and provisions are taken into consideration.

It is therefore, among others, some of the main objects of the present invention to provide means enabling automation of all the chief operational steps in bakery systems to which this invention appertains, further to economize in their machine set-up, to minimize quite considerably the surveillance of the latter and to simplify the transporting means for the bakery products to ensure a continuous and smooth performance of the machinery of such bakery systems.

In order to solve these and other problems, it is known to use carriers which correspond, for example, to half the length of the baking oven and which are assembled to form a frame before they are introduced into the oven. But since all tiltable supports holding the dough pieces must be operated at the same time, it becomes necessary to provide a central operation from an outer end of each frame.

The effort to design the machines of the above-mentioned type so that they can be operated by a single person results in a situation where the working rhythm of the machine depends on the working rhythm of the operator. If the operator does not provide a carrier frame with supports associated therewith for the introduction or access in time, the operation of the machine is slowed down and delayed. The same problem exists when the filled tiltable supports are subsequently emptied and removed from the machine. If the operator is not on the spot in time to remove a carrier with its supports from the machine, the following carrier supplied with dough pieces on its supports will cause accumulation and stoppage so that the machine shuts inself off or must be disconnected from its continuous drive.

The problem with which the invention is faced is to provide a combination dough dividing and rounding machine with a dough feeding and filling device which works independently of the working rhythm of the operator and which makes optimum use of the individual components of the machine.

Another problem of the invention is to ensure a continuous cycle while employing and maintaining conventional sizes of the carriers or frames.

Another problem to be solved by the invention is to provide a machine which affords a continuous charging of baking dough products onto carriers, particularly carriers with tiltable elements without the use of a take-off conveyor belt.

In a further development of the invention, the problem resides in the control of the movement of a swinging table in dependence on the position of the baking or fermentable dough goods supports associated with the respective carrier.

In a further development of the invention a related problem will also be solved, which concerns the charging of yeast dough products, particularly along a continuously working course for bakery products. It is very important to be able to effect the charging of products at a constant speed without interruption. Since the carriers or frames for retaining the products are equipped with handles, there exists a certain portion or zone between dough carrying frames during continuous feed, which frames cannot be filled completely. But in order to be able to let the roll course run continuously, it was necessary heretofore to use a so-called overflow take-off belt, which receives dough pieces from the delivery point of the roll course and effects the charging of the dough carriers. It became thus possible in a continuous operation along the roll course despite the presence of an interval or zone between the dough carriers due to the mentioned handles, that the zone for receiving the dough pieces may be charged correctly and as desired. The use of an overflow take-off belt requires, however, an increase of the roll course which requires more space for the entire plant. A take-off belt of the above-described type cannot be readily disposed of, because an acceleration or a slowdown of the roll course during the period in which non-fillable parts of the dough carriers reach the delivery station for loading the dough pieces, leads to disturbances in the operation. An acceleration or a slowdown of the delivery of the dough pieces can have the effect, for example, that the dough pieces no longer arrive in proper position onto the carriers. A brief disconnection of the driven course would likewise lead to intolerable complications, because various steps for actuating the roll course must also be interrupted.

A further development of the invention is thus based on the aim of eliminating the above-mentioned disadvantages, while doing away with an overflow take-off belt. Such elimination of a take-off belt permits an advantageous shortening of the roll course, so that reduced space can be taken up.

Another development of the invention is based on the fact to provide an apparatus for handling dough supporting carriers, with which in particular the dough pieces holding and tiltable trough or support apparatus can be moved, while at the same time a special tilting mechanism will be operated after the apparatus has been introduced into the oven.

Another aim of the invention consists in providing a device for handling tiltable, trough-equipped apparatus, with which heretofore known carriers can be used upon subjecting the latter to some modifications or changes in construction.

The invention solves a further problem by providing a device for handling dough carriers with which tiltable, substantially shallow trough apparatus of various sizes and dimensions can be operated.

The solution of such latter problem consists in that the carriers are taken automatically from a first magazine according to one embodiment of the invention by means of first transfer or transporting means controlled in dependence on the working speed of the dough dividing and rounding machine, further guided through a filling station, and then conducted via another transporting means out of the operational course of the combination dough dividing and rounding machine.

Another problem is solved according to the invention in that in a dough dividing and rounding machine, besides feeding and filling means as well as possibly a rolling station for the continuous preparation of relatively small baking products, the movement of a swingable table from an upper receiving position to a lower delivery position for moving a dough carrier out of such course of a combination machine to a delivery position and then back into the receiving position, which is effected by means of an electromechanical drive over corresponding control elements, which can be controlled and operated by switching elements which in turn may be actuated directly or indirectly by the dough carrier when the latter reaches a predetermined end position.

According to the invention each tiltable carrier unit or framework has an outer frame, whose dimension is adapted to the respective oven to be charged. In this frame are provided rung-like dough pieces supporting receivers constructed for rotative displacement about their longitudinal axis, so-called tiltable supports, which can be rotated and turned by at least 180° about their longitudinal axis by means of a special mechanism incorporated in the frame. The frames of such frameworks or units may be stacked and stored in magazines. At least on one of its front ends the frame of each tiltable carrier unit, there is located a special lever mechanism which extends in upward direction and perpendicular to the frame plane.

The solution of other problems according to the invention consists in that in an apparatus for handling dough carriers and for feeding and discharging dough pieces, a frame is created as supporting means with a release mechanism for tilting a relatively shallow trough system, the frame being connected with and for easy detachment from the trough system by means of coupling and counter-coupling elements.

According to the invention the lowermost or bottom carrier is arranged in a first magazine in actuation position and rests with the front end of the respective frame facing the dough dividing and rounding machine, on a releasable click or catch mechanism. Such lowermost carrier is arranged in a first magazine and while in calling position such carrier rests with the end of its frame remote from the dough dividing and rounding machine, on an inclined surface which is provided at least at its outer ends with coaxially arranged rollers extending partly with their circumference slightly through slots or apertures of said inclined surface.

The first conveyor mechanism for carriers is arranged according to the invention below bearing or supporting surface of the receiving device for the first magazine, which can be adjusted, in its velocity of feed, to the working speed of the dough dividing and rounding machine and/or may be controlled by it.

This first conveyor mechanism according to the invention has incorporated at least one chain drive, which carries at certain intervals, drivers or dogs extending during their movement in the direction toward the dough dividing and rounding machine through slots in the bearing surface. The dogs of the chain drive are so designed according to the invention that they engage at least one front end of a framework or carrier arranged on said bearing surface of the receiving device and conduct the latter under a conveyor belt of a dough rolling station and folding device provided with a second feeding mechanism for the dough carriers, which conducts the latter out of the dough dividing and rounding machine.

According to another feature of the invention the carriers can be fed to a second magazine by means of said second feed mechanism.

This second feed mechanism for carriers may consist according to the invention of an inclined surface through which feed rollers extend, whose axles form an angle with each other in a plane and in such a way that the carriers are conducted on a curved track into a second magazine by their own weight and/or by a following or subsequent carrier.

In another embodiment of the invention a swinging table rotatable about an axis, is arranged between the dough dividing and rounding machine and dough rolling and filling station. The axis of rotation of the swinging table extends horizontally and perpendicular to the direction of conveyance of the dough pieces from the combination dough dividing and rounding machine with its rolling station. Below this swinging table is arranged a drive for a second feed or transporting mechanism for discharging the carriers. This second feed mechanism according to the invention has at least one chain drive, which has at certain intervals drivers or dogs which extend during their movements horizontally and perpendicular to the direction of conveyance for the dough pieces, at the lowermost position of the swing table through recesses or slots in the table surface.

In another embodiment of the invention the balancing weight for returning the swing table from its lowermost into the top or uppermost position, is replaced by a drive which now positively carries out the entire movement of the swing table and which is controlled by the dough products carrying framework.

To this end at least one switching element is secured adjustably on or at the swing table or in a correspondingly arranged recess parallel to the plane of the swing table in such a way, that the switching element can be released or operated by dough carriers having varying size. Accordingly, an electromotor drive is arranged below the swing table whose drive shaft is connected via an eccentric by means of a connecting rod directly to the swing table. The movement of the swing table can thus be carried out in a more positive manner. As switching elements are used either optically or mechanically known responding elements. In the entering or feed direction of the dough carrier at the end of the swing table there is arranged a main or safety limit switch. When the swing table reaches the lowermost delivery position of the dough carrier, it acts on a limit switch which starts the motor of the feeding mechanism for moving the dough carriers out of the operational course of the combination dough dividing and rounding machine.

The motor for moving the dough carrier is operatively connected with a chain drive which possesses at suitable intervals actuating elements or drivers influencing when the starting stage of the dough carrier is reached, a limit switch which starts the motor for the ascending and descending movements of the swing table, which, in turn, returns the swing table by means of eccentric and connecting rod from its lowermost delivery position to the top or uppermost receiving position, so that the swing table becomes ready to receive a new dough carrier. Due to the ascending movement of the swing table, a limit switch is actuated which disconnects the driving motor for the chain drive, so that the chain drive comes to a stop.

In further development of the invention the trough tilting framework or apparatus includes a plurality of tiltable troughs or supports across its entire width, which supports are connected with each other via a control mechanism arranged on one side of the tiltable trough frame for carrying out rotatable or tilting movements or displacements. According to the invention the control mechanism of the tiltable trough apparatus for carrying out its tilting movements for the tiltable trough elements has at one end a coupling member which engages a counter-coupling member of a release mechanism of the frame which is designed as a support device. The frame of the tiltable trough apparatus is preferably provided at both ends with a distance piece, such as a rod or tube forming a connection between two frame beams. At one end of the frame of the tiltable trough apparatus there is arranged on each side beam a locking element in such a way, that it acts in connection with the corresponding distance piece as a further coupling member which engages a corresponding counter-coupling member of the frame designed and engageable as a support therefor. The carrier frame may be provided with a handle piece, which is firmly connected to the ends of two guide bars of the frame. Parallel to the handle there is arranged on the side of the frame equipped with the counter-coupling members a crossbar which passes through the two guide bars and forms projections or lugs which are designed as counter-coupling members of the locking elements of the tiltable trough apparatus. The two guide bars of the supporting device are advantageously provided on their side opposite to the handle with open recesses which serve to receive a corresponding distance piece or tube of the tiltable trough apparatus. Between the handle and the crossbar of the support device and parallel to them there is arranged a turnable handle whose longitudinal axis is rotatably mounted in openings of the guide bars and which is rotatably coupled with a pawl acting as release, the axis of rotation of this pawl extending parallel to the longitudinal axis of the turning handle and being connected at one end by means of a tension spring to one guide bar, while the other end has a counter-coupling member which is engageable with the coupling member of the control mechanism of the tiltable trough apparatus. In order to simplify the operation, the pawl is provided with a pressure plate. The pawl is guided by a guide piece connected with the support device. In order to facilitate introduction and coupling of such device with the tiltable trough apparatus, the front end parts of the guide bars provided with recesses are shaped slightly to extend toward the crossbar.

Further details and advantages of the invention will become evident from the ensuing description of various practical embodiments pursuant to the invention given solely by way of examples, in conjunction with the accompanying drawings, in which:

FIG. 19 a–d indicates cross-sections through a tiltable trough equipped carrier in various positions with a dough piece thereon.

DETAILED DESCRIPTION OF PREFERRED EMBODIMENTS OF THE INVENTION

Figure 1:
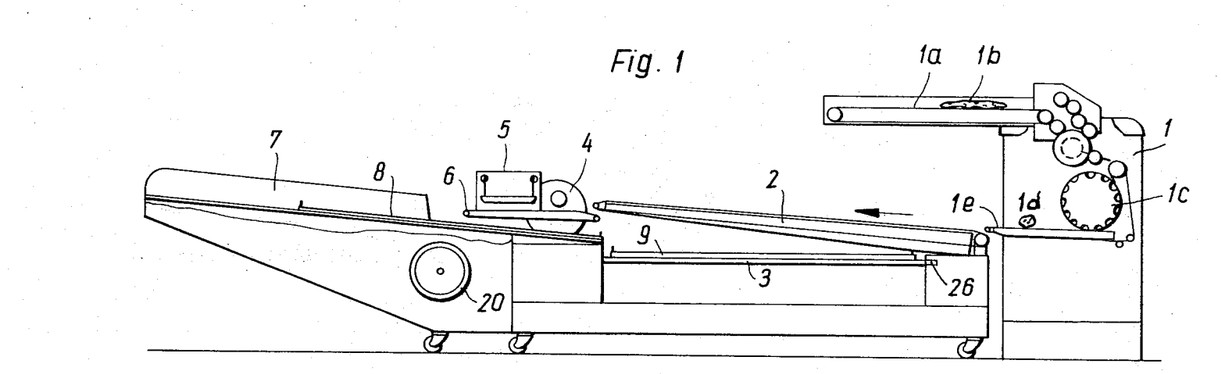
FIG. 1 shows a cross-section through the entire plant of the combination dough dividing and rounding machine with feeding and filling means.
Figure 2:
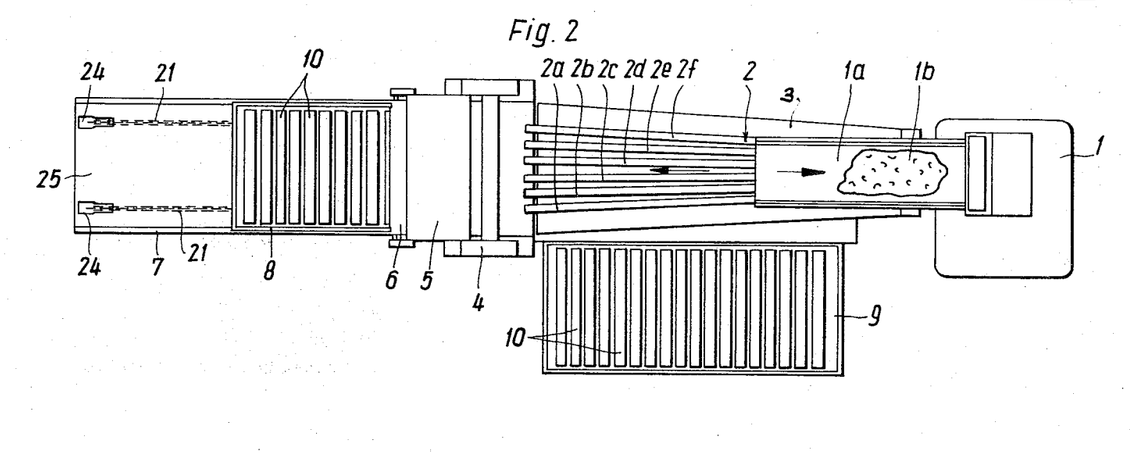
FIG. 2 is a top plan view of the plant according to FIG. 1.
Figure 3:
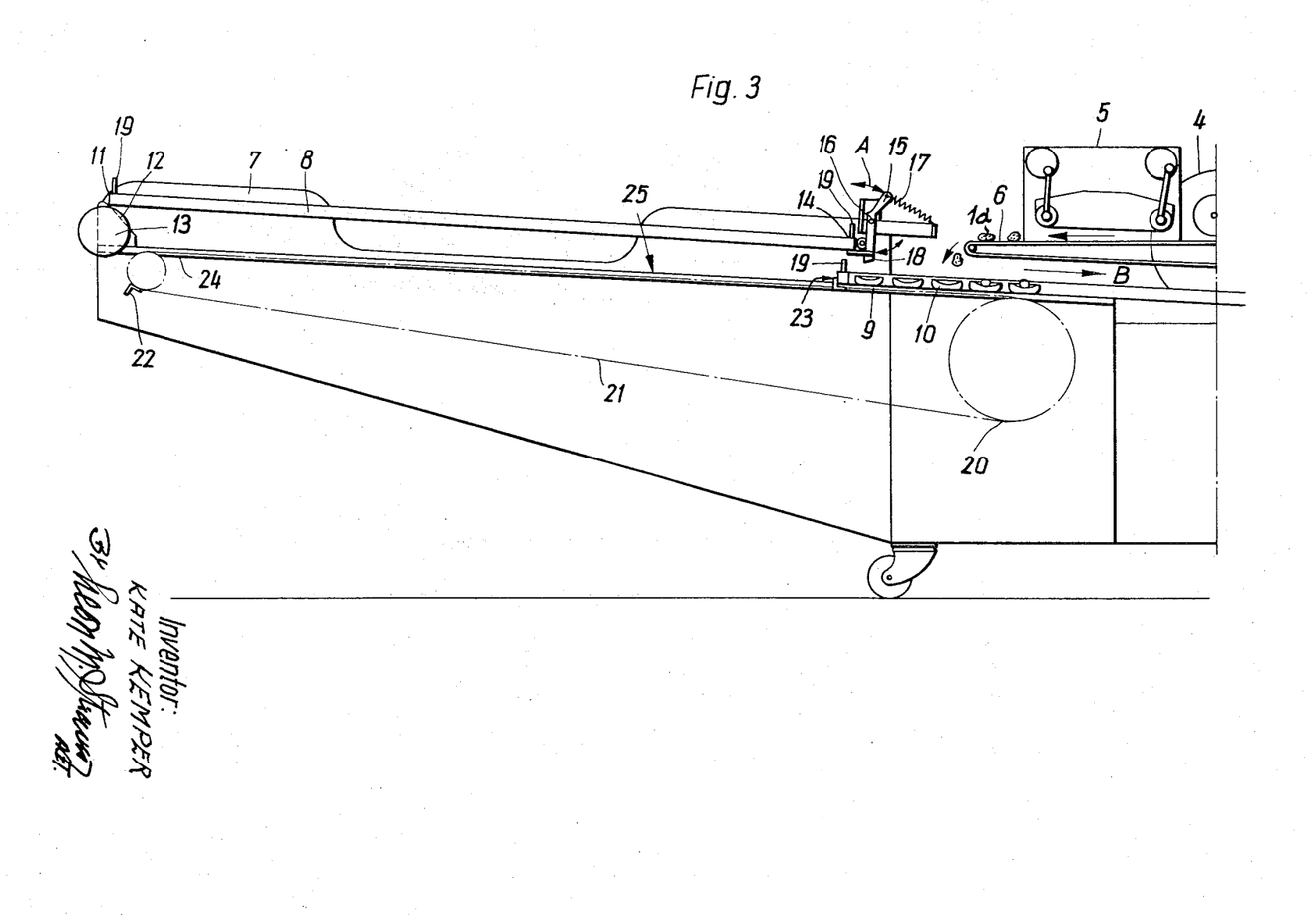
FIG. 3 shows an enlarged representation of the first magazine with a part of a rolling station and folding device.

Referring now more specifically to FIGS. 1 to 3 of the drawings there is disclosed according to FIG. 1 a dough dividing and rounding machine 1, which is joined by an expanding or spread conveyor belt 2 with a swing table 3 located underneath said belt. A rolling station 4 together with a dough rollover folding device 5 cooperate with a conveyor belt 6 which feeds the finished and rolled dough pieces to a framework or carrier 8 which is discharged from a magazine 7. The above-mentioned train of machines is known per se.

The machine for delivering bakery products embodying the invention will now be described in detail together with the operation and salient features thereof.

Dough pieces or products 1b are fed to the dough dividing and rounding machine 1 via an upper conveyor belt 1a along a predetermined stretch of certain length. The form of the dough pieces is not defined, as they are rolled and shaped to a dough band and then divided by means of dough knives (not shown) and thereafter rounded in a rounder of known structure 1c. The round dough pieces 1d thus obtained leave the machine 1 at a distribution point 1e (e.g., conveyor belt) and arrive on an expanding or spreading conveyor belt 2 provided with diverging guide parts. The latter consist, for example, of six conveyor belts 2a to 2f which are diverging with respect to each other in the direction of movement of the conveyance (indicated by the arrow). The dough pieces 1d issuing from the rounding device 1c and from the distribution point 1e, respectively in phase-shifted relation are so aligned by the expanding conveyor belts 2a to 2f, that they reach the rolling station 4 in row formation at the same time and are aligned with and located adjacent each other. In the rolling station 4 these dough pieces are rolled flat (not shown) and are subsequently folded or rolled over by folding device 5 to an oblong rolled piece.

This rolling station 4 and folding device 5 constitute a so-called "forming station" discharging the dough pieces in rolled formation. The dough pieces leave then the rolling station 4 and folding station 5 and are moved by conveyor belt 6 to drop into the dish-shaped, somewhat shallow supports 10 which are tiltable for rotative displacement. Each of these frames or carriers 8 moves continuously or intermittently in the direction toward forming station 4, 5 as seen in FIGS. 1 to 3.

FIG. 3 indicates only one empty carrier 8 arranged for clarity's sake still in magazine 7. Carrier 8 rests with its first end face 11 on an inclined surface 12 through which is guided by means of suitable slots the outer peripheral rim ends of rollers 13 in such a way, that these rollers (only one roller being seen) extend with a part of their circumference slightly via slotted openings (not shown) through inclined surface 12. The opposite second end face 14 of the carrier 18 rests within magazine 7 on the lever arm 15 forming part of a pawl mechanism which can be rotated about axis 16 against the tension of a spring 17 anchored in said magazine. The pawl mechanism is equipped with a release nose 18 which can be actuated by a release striker 19 arranged adjacent both opposed end faces 11, 14 of the carrier.

A first drive mechanism 20 comprises a chain drive with chains 21, which carries at certain intervals drivers or dogs 22 and 23. The drivers 22 and 23 extend along their movement in the direction toward the dough dividing and rounding machine 1 through suitable recesses 24 which are arranged to extend through the bearing surface 25 (FIGS. 2 and 3).

At the start of the operational cycle magazine 7 is filled with a framework or carrier 8 and by actuating the aforesaid pawl mechanism this carrier 8 is moved to the bearing surface 25 and is brought into engagement with the conveyor belt by means of the drivers 22 and 23 and feed mechanism 20, working in synchronism with the actions of the dough dividing and rounding machine 1. When its release striker 19 reaches thus the release nose 18 of the pawl mechanism and rotates the same about axis 16 in the direction of arrow A, and a carrier 8 drops from magazine 7 onto the bearing surface 25, the inclined surface 12 in cooperation with the rollers 13 ensures that the first end face 11 of the carrier arrives by weight of the latter without any substantial friction on the table or bearing surface 25. The following driver 22 arranged in proper distance to the length of the carrier 8 engages then the first carrier end face and feeds it without leaving any spacing for contact with the preceding carrier 9 in the direction of arrow B (FIG. 3).

Figure 4:
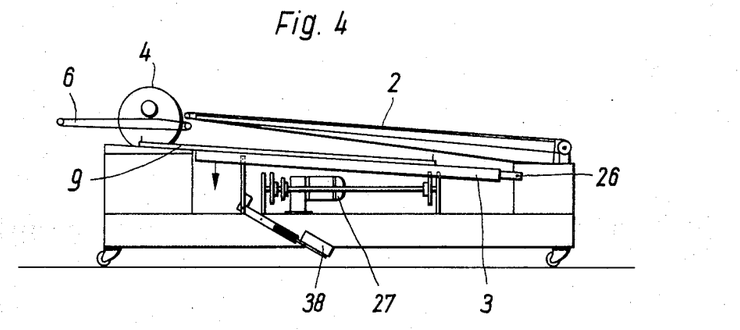
FIG. 4 illustrates a second feed mechanism with a swing table at a moment when a carrier with tiltable elements is conveyed to the surface of the swing table.

As it can be seen from FIG. 4, carrier 9, whose trough-shaped elements in this position are already completely filled with dough pieces (only partly indicated), reaches swingable table 3, which assumes its top position. Further movement of carrier 9 is effected by the then following carrier 8, which is not shown in FIGS. 4, 5 and 6.

But according to the invention it is contemplated to construct and to design the above-mentioned feed mechanism 20 so that the respective carrier may also be moved completely or partly forward onto the swingable table 3.

Figure 5:
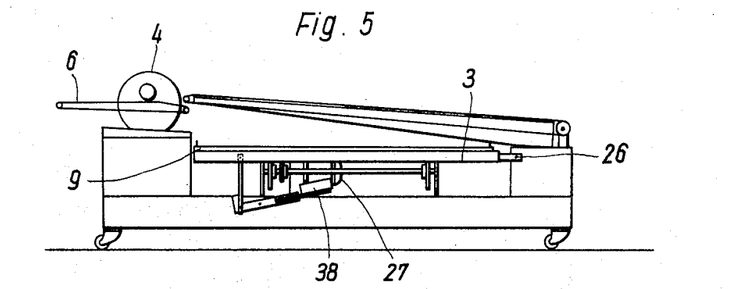
FIG. 5 shows a device according to FIG. 4, but at a stage when the swing table with a carrier on top, is in its bottom position.
Figure 6:
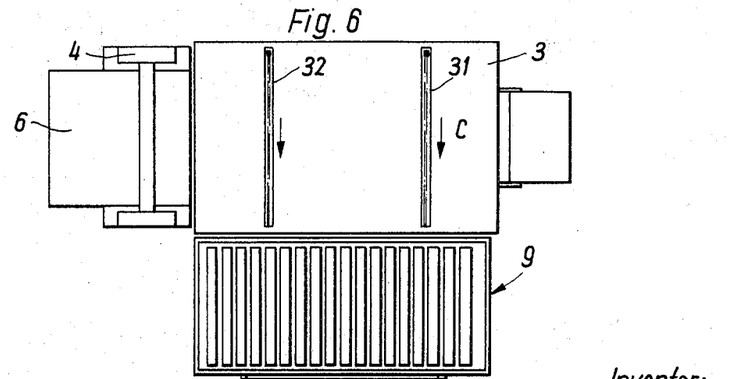
FIG. 6 is a top plan view of the swing table at a stage when a tiltable carrier has already been displaced to a second magazine.

When the carrier 9 is completely resting on the swingable table 3, the latter swings then downward about its axis 26 into the position shown in FIG. 5. Underneath the swing table 3 is arranged a drive 27 for a second feed mechanism for moving carrier 9 filled with dough pieces in lateral direction (arrow C of FIG. 6), thus transversely to the previous lengthwise operational course (arrow B). This drive 27 includes a chain drive 28 (as disclosed in FIGS. 6–8) which carries at certain intervals drivers 29 and 30 which extend during movement horizontally and perpendicular to the direction of conveyance of the dough pieces through recesses 31 and 32 (FIG. 6) which are provided in the table surface of the swingable table 3. When the swingable table is in its bottom or lowermost position (FIGS. 5 and 7), the drivers 30 and 29 pass through these recesses 31, 32 of table 3 and can then engage carrier 9 which is placed on said swingable table 3.

Figure 7:
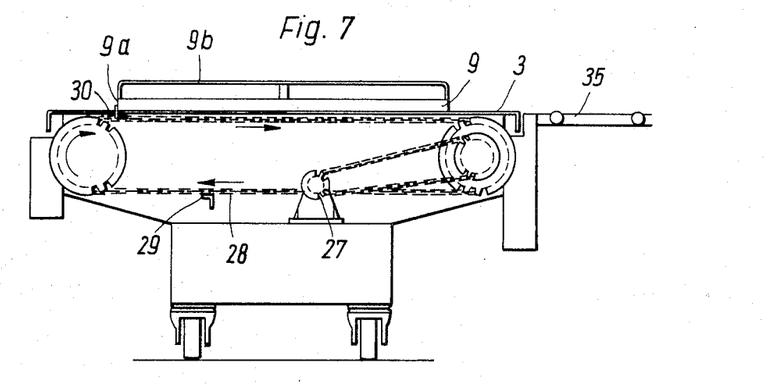
FIG. 7 shows a cross-section through the swing table and a second feed mechanism at a moment when the swing table is in its bottom position and conveys a tiltable carrier into a second magazine.
Figures 8, 9:
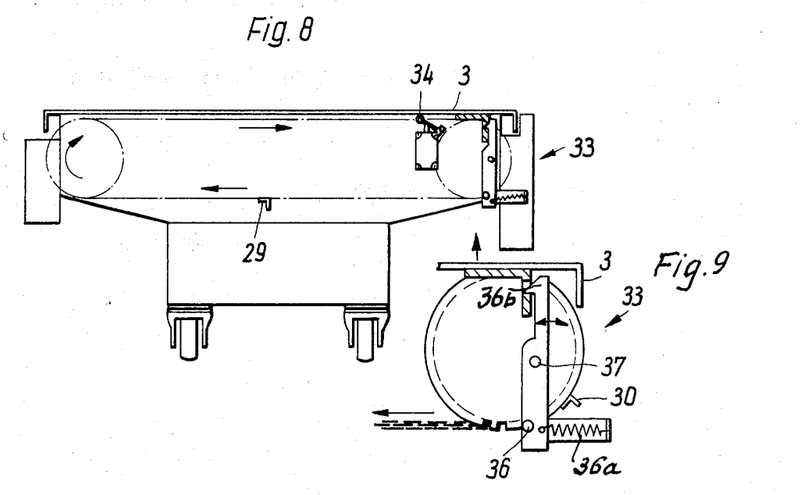
FIG. 8 shows a section through a swing table and a locking mechanism, as well as a limit switch.
FIG. 9 is an enlarged detail of the locking mechanism according to FIG. 8.

When the table 3 swings down on account of the weight of the dough-filled framework or carrier according to FIG. 4 and is retained by a pawl mechanism 33 (FIGS. 8 and 9) in this latter position, it actuates at the same time a limit switch 34 upon reaching such bottom position. The feed mechanism 27 is thus started. A driver 30 of the chain drive 28 thus engages a side bar 9a of the frame 9b of carrier 9 and feeds the latter into another magazine which, as shown in FIG. 7, for the sake of simplicity appears there as a laterally arranged receiving table 35.

The revolving driver 30 (FIG. 9) engages then a lever or lever abutment 36 which lever swings about an axis 37 (against spring action 36a) so that the swing table 3 becomes disengaged from hook 36b of lever 36 and returns by its balancing or counterweight 38 again to the top or uppermost position (FIGS. 4 and 5). The table 3 is thus ready to receive the following carrier 8.

Figure 10:
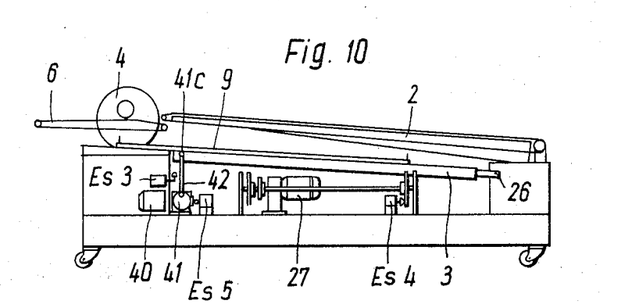
FIG. 10 shows another embodiment of the invention with a second feed mechanism and a swing table at a stage when a dough loaded carrier is conveyed onto the surface of the swing table.
Figure 11:
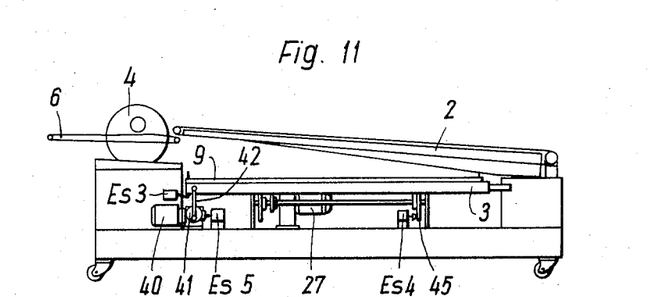
FIG. 11 shows a device according to FIG. 10 but at a stage when the swing table with a dough loaded carrier is in its bottom position.
Figure 12:
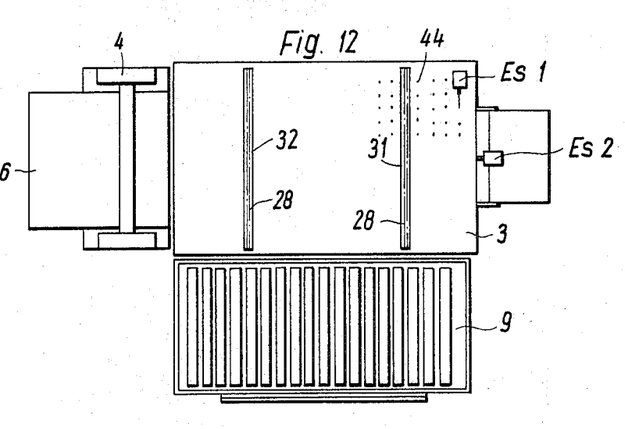
FIG. 12 shows a top plan view of the swing table at a stage when a dough loaded carrier has already been moved to a second magazine.
Figure 13:
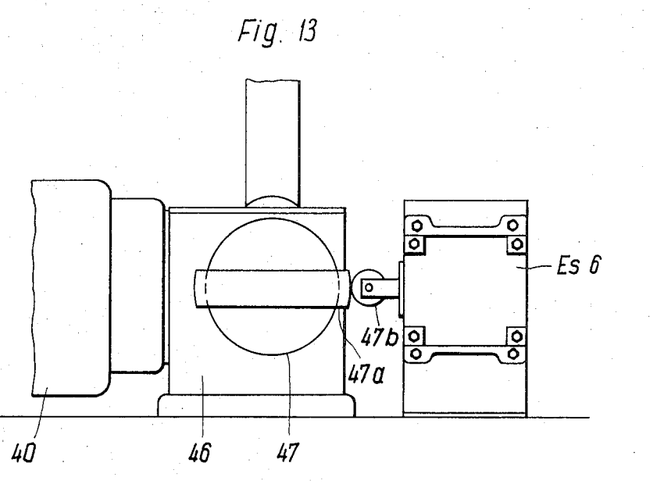
FIG. 13 depicts a side view of the motor together with a gear and a cam disk with limit switch arrangement.
Figure 14:
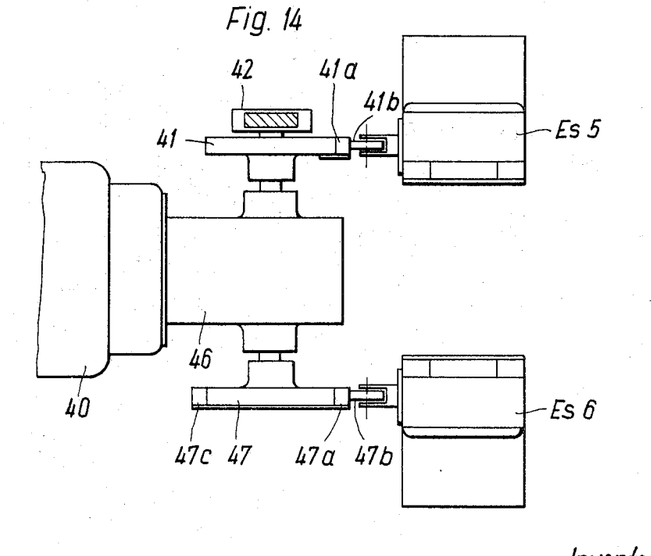
FIG. 14 is a top plan view of FIG. 13.

Pursuant to a further development of the invention represented by FIGS. 10 to 14, it is also possible to modify and design the first feed mechanism 20, so that the carriers 8, 9 can be fed completely and directly by it to the swing table 3. When the carrier 9 has reached the rear end of the swing table 3, it abuts and engages a limit switch Es 1 (FIG. 12), which, in turn, starts a further drive motor 40 (FIG. 11). According to the invention, tiltable carriers of different size or having different dimensions can be employed in this manner. In order to be able to handle different sizes of dough carriers, the limit switch Es 1 can be secured at and set in different locations on the swing table 3 by insertion of such switch into one of the bores 44 as may be easily realized. The motor 40 has a transmission box 46 (FIG. 14) to which are connected on each side cam disks 41 and 47. Cam 47a of cam disk 47 acts on a rolling contact 47b of a known limit switch Es 6, while cam 41a of cam disk 41 operates a rolling contact 41b of a similar and known limit switch Es 5. With cam disk 41 is rotatably and axially secured a connecting rod 42, which, in turn, is articulated to the swing table 3 at 41c (FIG. 10).

By starting the motor 40 via limit switch Es 1, which is actuated by carrier 9, the cam disk 41 and thus the connecting rod 42 are set in motion, so that the swing table 3 moves into the bottom or lowermost position (FIG. 11). Due to the rotation of cam disk 41, the switch Es 5 opens and the switch Es 6 closes, the latter being actuated by cam disk 47. When the swing table 3 has reached the bottom position by means of connecting rod 42, the swing table 3 actuates the limit switch Es 3 (FIG. 10), which starts motor 27 (FIG. 11), so that the carrier supporting dough pieces can be moved out of its previous lengthwise course through lateral direction by the drivers running in the slots 31 and 32 of table 3. In this stage switch Es 5 is open and likewise switch Es 1, which is arranged in series with the switch Es 5. A second or further cam 47c of cam disk 47 actuates in this bottom position limit switch Es 6 and keeps it open until the motor 40 is shut off.

By striker 45 (FIG. 11) arranged on the chain drive for the lateral movement of the dough carriers the limit switch Es 4 is actuated when the carrier 9 has reached its lateral extended position. The limit switch Es 4 and is arranged parallel to the switches Es 1, Es 5 and Es 6, so that the motor 40 is started and the cam disks 41 and 47 are set in rotation and connecting rod 42 moves the swing table 3 back into its upper position. The switch Es 3 is thus opened again, so that the motor 27 for the chain drive is operated and the chain drive stops (FIG. 10). When the swing table 3 has reached its upper position, the cam 41a on cam disk 41 closes the switch Es 5 which is arranged in series with the switch Es 1, which, however, is still open since no new dough carrier has arrived yet for placement on the swing table. The second cam 47c of cam disk 47 opens the switch Es 6 when the swing table 3 has reached its upper position. Since the switch Es 4 has also been opened in the meantime by the corresponding movement of the striker 45, the circuit for motor 40 is opened again so that the swing table 3 remains in its top or upper position until the switch Es 1 is again closed by another dough carrier as may be realized. This cycle is thus repeatable. The switch Es 2, which is arranged in series with all the other switches, serves as a main safety limit switch which disconnects the drive for the entire feeding systems if the locally changeable switch Es 1 fails.

The arrangement of the swing table according to the further improvement of the invention advantageously permits to move out one carrier without influencing the continuous operation of the entire plant, which goes meanwhile on. The entire plant is thus practically completely independent of the output or of the working rhythm of an operator, since a first or feeding magazine 7 is available for empty carriers and a second or delivery magazine 35 ready for the carriers filled or loaded with dough products. This means, however, that the individual units of the combination dough dividing and rounding machine system are utilized to the maximum and can thus be operated under highly economical conditions.

It is only necessary for an operator to make available a first magazine filled with empty carriers and a second magazine for receiving and delivering the filled carriers. The machine according to the invention works then fully automatically, after the switching or starting elements have been actuated, until either the first magazine becomes empty or the second magazine is filled up. Only at that time an operator will be required to effectuate a new supply of carriers for the first magazine or to cause further handling of the filled carriers from the second magazine. Due to the electromechanical drive used for moving the swing table from its top position to its lower position and back, this movement is independent of the weight of the dough loaded carriers, so that the working or operational speed can be predetermined.

FIGS. 15 to 18 indicate an appliance or apparatus for handling dough carriers, in particular tiltable trough apparatus, according to which a specific important problem of the invention may be solved, namely, a shortening of the so-called roll course (combined dough dividing and rounding device with forming station). Besides this, a continuous operation of the so-called roll course will be ensured, since the tiltable trough apparatus used for feeding the rolls from the roll course to the oven is devoid of a fixed handle forming part of the trough apparatus. The invention hereinafter described serves the solution of this task to manipulate and operate the carrier frame not equipped with grips or handles.

Figure 15:
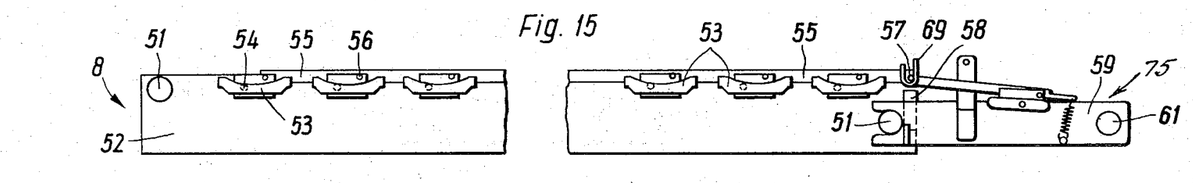
FIG. 15 shows a tiltable trough apparatus which is connected with the machine according to a further development of the invention.
Figure 16:
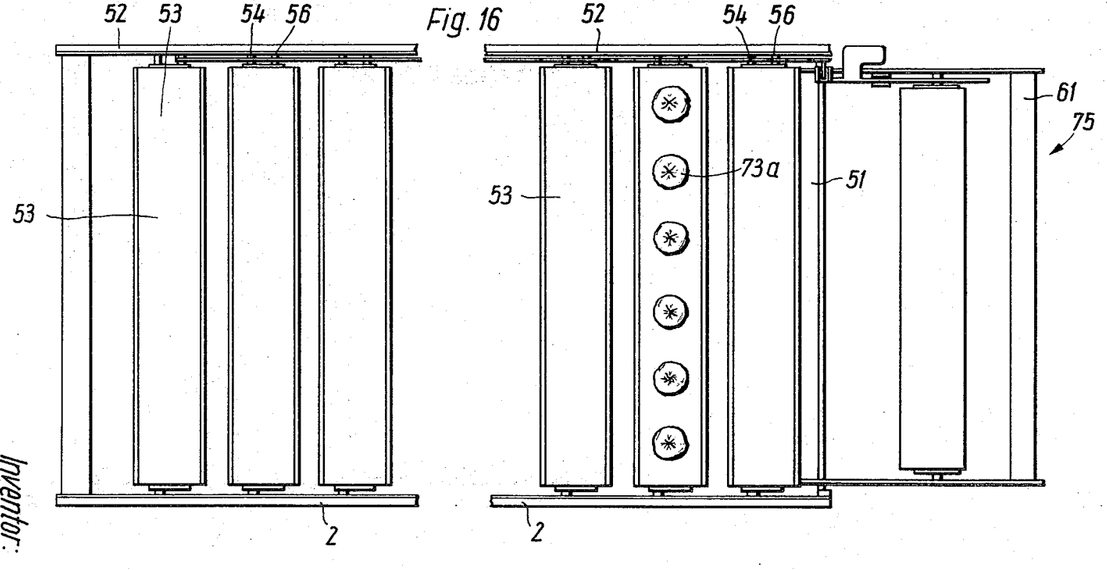
FIG. 16 is a top plan view of FIG. 15.

The trough apparatus depicted in FIG. 15 has at both opposed ends a distance piece or tube 51 which represents a rigid connection between the two side bar members 52. The individual, tiltable troughs 53 are mounted for rotation about a respective stub shaft axis 54. On one side bar member 52 there is arranged a control mechanism for carrying out all the tilting movements of all tiltable troughs of a frame 52. This mechanism comprises a linkage arrangement 55 which is rotatably connected with each tiltable trough 53 by means of an eccentric bolt 56. The linkage arrangement 55 is provided adjacent one end of the tiltable trough apparatus with a coupling member 57 which can be designed as a bolt or a cam as shown. At one end of the frame 51, 52 of the tiltable trough apparatus there is arranged on the inner side of one side bar member 52 a locking element 58 which is so arranged and structured that it will act in connection with the other or corresponding distance piece 51 as an additional coupling member.

Figure 17:
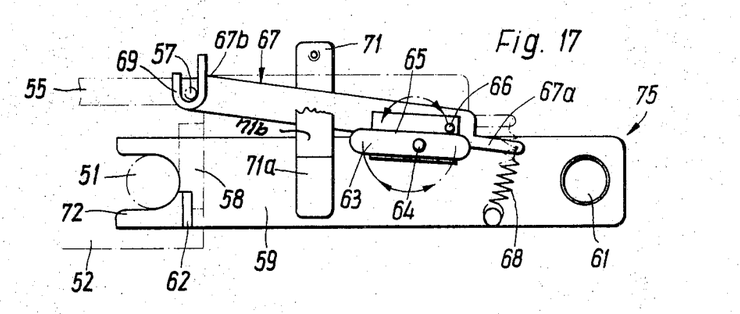
FIG. 17 shows the device for handling dough loaded carriers on an enlarged scale with respect to FIGS. 15 and 16.
Figures 18, 19:
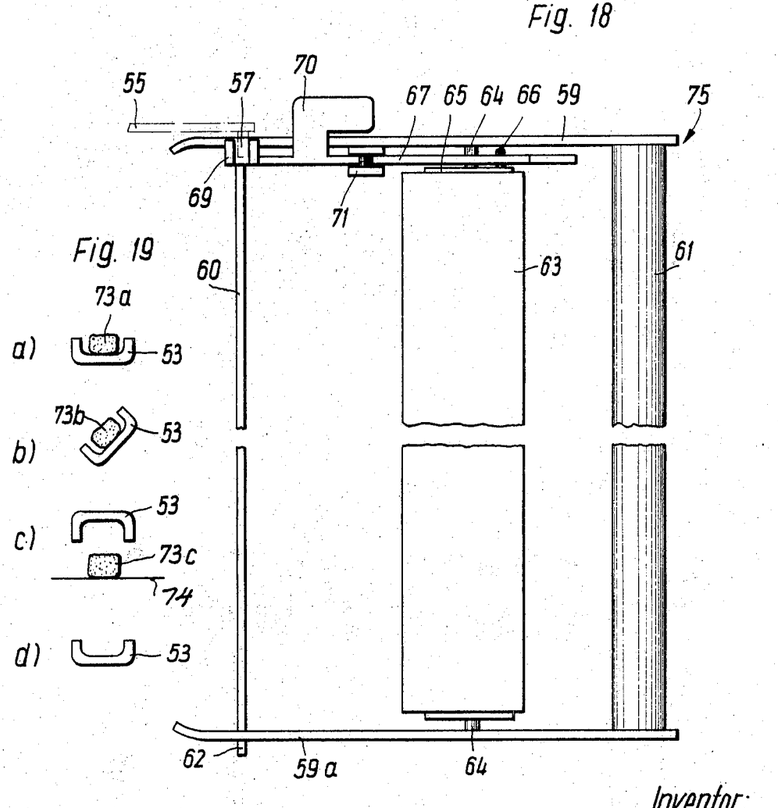
FIG. 18 is a top plan view of FIG. 17.

The apparatus for handling such dough carriers is more clearly depicted on an enlarged scale in FIGS. 17 and 18. In this instance, the tiltable grip device 75 according to the invention, is shown to consist of two guide bars 59, 59a; of a crossbar 60 connecting the guide bars 59, 59a and of a tubular piece 61 serving as a handle and connecting the guide bars 59, 59a on one end. The cross bar 60 passes through the guide bars 59, 59a and forms thus on each outer side of the guide bars 59, 59a lug-shaped element 62 which is designed as a counter-coupling member of the locking elements 58 of the tiltable trough apparatus. Between handle grip 61 and crossbar 60 there is arranged parallel thereto a turning handle 63 (for tilting the pivotable troughs, as schematically indicated in FIG. 19), whose longitudinal axis 64 is mounted for rotative displacement of said handle relative to both guide bars 59, 59a. On one side of actuatable handle 63 is secured a connecting piece 65 on which is arranged a bolt 66, which is rotatably connected to a release lever mechanism 67. One end 67a of lever 67 is connected via a tension spring 68 to one guide bar 59, while the other end 67b carries a counter-coupling member 69, which is grooved and designed as a J-shaped piece. This counter-coupling member 69 is so shaped that it can be coupled with the coupling member 57 which forms one end of the linkage arrangement 55 (see also FIG. 15).

In order to simplify the handling of the release lever 67, a pressure plate 70 is provided. Lever 67 is embraced by a guide piece 71 which is secured at 71a to guide bar 59 and which has a guide slot 71b through which lever 67 extends. Both guide bars 59, 59a are provided at the ends located opposite to the handle grip 61 with a fork-like extension 72 which is so dimensioned that it can receive the distance tube 51 of the tiltable trough apparatus or carrier 8 or 9.

The operation of the aforesaid mechanical gripping device 75 according to further developments of the invention is as follows: The tiltable trough carriers 8, 9 filled with dough pieces are arranged on cars or trays during dough fermentation and may be stacked in magazines of suitable sizes or dimensions. The gripping mechanism is then connected to one tiltable trough carrier. The connection of the frames with the aforesaid mechanical device 75 according to the invention can be effected rapidly in a very simple manner by pushing this device 75 in inclined position of about 15° to the horizontal, to bring about from below engagement of distance tube 51 with the engageable fork-shaped extensions 72. For establishing a coupling joint it becomes necessary to push pressure plate 70 (FIG. 18) down against the action of spring 68, so that the J-shaped counter-coupling piece 69 of the device coacts and connects with coupling member 57. If the device 75 according to the invention is now lifted and turned about the tubular distance piece 51, the lugs 62 move behind the corresponding locking elements 58, so that a joint is formed between the device 75 and the tiltable trough framework which can be subjected to tension and compression. This trough carrier can thus be transported in a simple manner and pushed into a treatment plant, such as an oven (not shown). When the trough carrier has reached (during its movement in longitudinal direction) its end position in such oven, the release mechanism 67 is moved forward over the J-shaped piece 69 forming a counter-coupling piece by rotating a turnable handle bar 63 so that the linkage rod 55 is likewise pushed in forward direction and the tiltable troughs 53 are thus rotatably displaced about their swing axis 54. The dough pieces arranged in the trough-shaped supports 53 are thus thrown off or rather turned over (see FIG. 19) and arrive on the oven plate 74. By turning the handle bar 63 again in opposite direction, the tiltable trough elements 53 return empty to their starting position and the tiltable trough-supporting apparatus can be pulled out of the oven by means of device 75. After such trough-supporting apparatus has been removed from the oven, the device 75 according to the invention is again detached from the tiltable trough-carrying frame by pushing down the release lever 67 (to full-line position) again, thereby lowering the device 75 until lugs 62 of cross-bar 60 become disengaged and free. The device 75 according to the invention is then available for manipulation of and for handling other tiltable trough-equipped carriers.

The invention permits a direct filling of tiltable trough elements of carrier apparatus for baking ovens without the employment of take-off belts, as heretofore known. Thus the course for rolls or similar bakery products handling and treating stations can be made considerably shorter, so that valuable space can be saved and a faster production can be afforded. Besides these advantages the invention permits stacking of the trough-equipped carriers on table and like magazines. Even existing tiltable trough-equipped machinery can be used after some modifications or changes are made and can be handled in a greatly simplified manner according to the invention. The above system according to the invention can also be used for handling dough loaded carriers for different tiltable trough apparatus having different lengths and dimensions.

The aforesaid and other modifications of the invention are covered by the latter in its broadest aspects. The invention is not considered to be limited to the particular embodiments herein illustrated and described. Departure of any sort may be had without deviating from the principles of this invention and without sacrificing any and all advantages.

What is claimed is:

1. A dough treating plant for the continuous making of discrete dough pieces, said plant having a combined dough dividing and rounding machine; a rolling station combined with a dough rollover folding device; means for transferring the dough pieces from said rounding machine to said rolling station; a filling station where the dough pieces, subsequent to their treatment in the rollover folding device, are loaded on consecutively fed carriers of predetermined length and width; means for transferring the dough pieces from said rollover folding device to said filling station; comprising in combination:
a. a first magazine containing said carriers and being arranged for releasing said carriers consecutively, said first magazine being spaced from said filling station;
b. a first conveyor means extending between said first magazine and said filling station for moving the empty carriers in succession from said first magazine to said filling station and moving each carrier therethrough while it is being loaded with dough pieces, said first conveyor means having an operational velocity controlled in dependence of the operational velocity of said dough dividing and rounding machine;
c. a second conveyor means operatively coupled to said first conveyor means for receiving the carriers filled with dough pieces directly from said first conveyor means, said second conveyor means being arranged for moving each loaded carrier laterally with respect to the feed direction of said first conveyor means, said second conveyor means having a discharge end; and
d. a second magazine operatively connected to said charge end of said second conveyor means for receiving therefrom said loaded carriers in succession.

2. A dough treating plant as defined in claim 1, wherein said second conveyor means includes:
a. a swing table pivotally supported about an axis for assuming an upper position in which it receives a filled carrier from said first conveyor means and a lower position in which said filled carrier is advanced from said table to said second magazine;
b. a first drive means coupled to said swing table for moving the latter from one of its said positions into the other;
c. a first switch means controlling said first drive means, said first switch means is arranged to be triggered by a filled carrier when received on said swing table, whereby the latter is moved from its upper position to its lower position;
d. a transporting means engaging the filled carrier on said swing table when the latter arrives in its said lower position;
e. a second drive means coupled to said transporting means for moving the latter laterally with respect to the feed direction of said first conveyor means;

f. a second switch means controlling said second drive means, said second switch means is arranged to be triggered when said swing table arrives in its lower position, whereby said transporting means is energized for moving said filled carrier from said swing table to said second magazine;
g. a third switch means controlling said first drive means, said third switch means is arranged to be triggered when said filled carrier, moved by said transporting means, clears said swing table, whereby said swing table is moved by said first drive means from said lower position to said upper position for receiving another filled carrier.

3. A dough treating plant as defined in claim 2, wherein said second switch means is in cooperating relationship with said swing table to be operated by said swing table when the latter arrives into and moves out of its said lower position.

4. A dough treating plant as defined in claim 2, wherein said transporting means is positioned under said swing table and includes dog elements, said swing table includes means defining slots through which said dog elements protrude when said swing table is in its said lower position for entraining a filled carrier positioned on said swing table.

5. A dough treating plant as defined in claim 1, wherein said first magazine includes carrier releasing means for depositing the empty carriers stored in said first magazine in succession of said first conveyor means.

6. A dough treating plant as defined in claim 5, wherein each dough carrier has a trailing end provided with means for triggering said releasing means.

* * * * *